Oct. 1, 1946.     R. MESTAS     2,408,524
ELECTRIC GAUGE
Filed Aug. 3, 1940
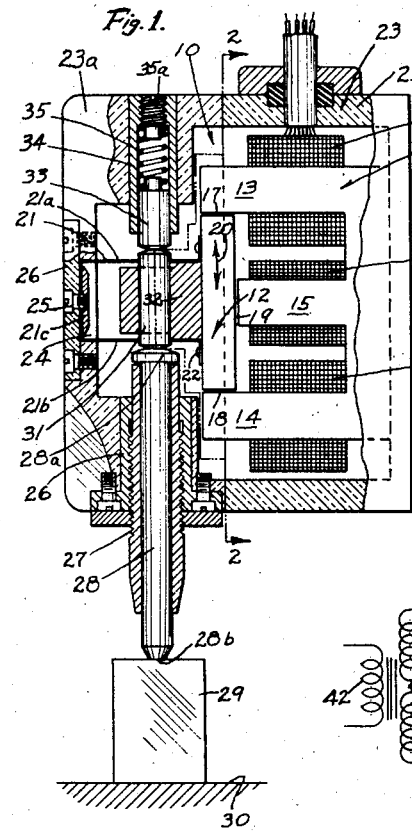
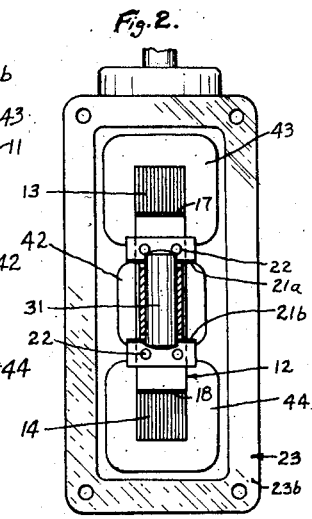
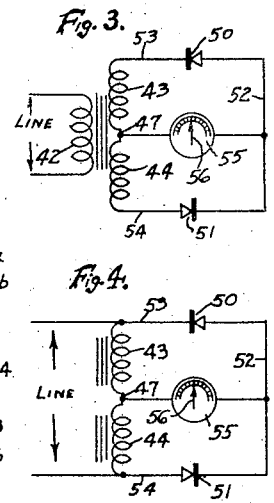
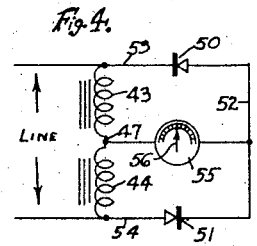
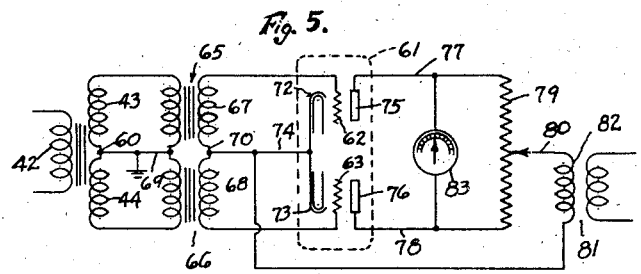
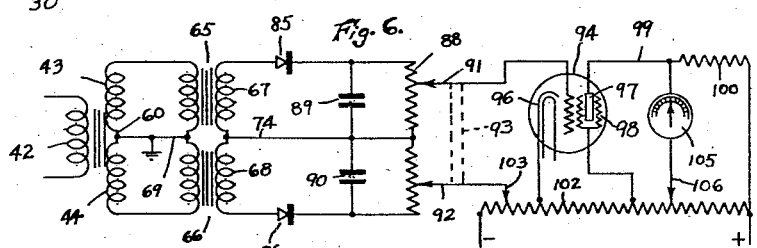
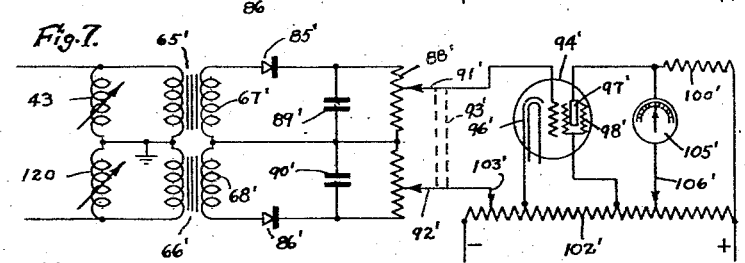
INVENTOR
RICARDO MESTAS
BY
HARRIS, KIECH, FOSTER & HARRIS
Clarence F. Kiech
FOR THE FIRM
ATTORNEYS Patented Oct. 1, 1946

2,408,524

UNITED STATES PATENT OFFICE 2,408,524

ELECTRIC GAUGE

Ricardo Mestas, Los Angeles, Calif., assignor to Kobe, Inc., Huntington Park, Calif., a corporation of California Application August 3, 1940, Serial No. 350,939

20 Claims. (Cl. 177—351)

1

My invention relates to an electric gauging or measuring device of the comparator type by which displacements can be indicated accurately and which is particularly adapted to the accurate gauging of various specimens or various sections of the same specimen. More particularly, the invention is concerned with a measuring device of extreme accuracy within predetermined limits, and which is capable of giving at a remote point a motion, displacement, or indication proportional to the displacement of an element of a control unit. The term "linear" is hereinafter used with reference to such proportionality with respect to displacement.

In general, it is an object of the present invention to provide a novel comparator or gauge which is extremely accurate and of simple construction, and in which the readings obtained are substantially unaffected by changes in the applied potential.

The invention has among its objects the provision of a novel control unit including a magnetic circuit with a variable air gap and a winding disposed adjacent the core of the magnetic circuit whereby the potential across the winding varies in response to changes in the air gap, this potential being usable for accurate detection of small changes in size of the gap.

Another object of the invention is to provide a control unit including an armature mounted in a novel manner which is both simple and substantially frictionless, this armature being moved in response to the measurement to be taken.

It is another object of the invention to provide a simple and reliable circuit adapted for connection to a control unit in which the reluctance of the flux path is changed in response to the measurement to be taken.

A further object of the invention is to provide such a circuit adapted for connection to a linearly-calibrated meter and which indicates both positive and negative deviations from the desired value at which the comparator is set.

In some of its embodiments, the present invention contemplates the development of a potential which varies somewhat non-proportionally or non-linearly with displacement of an element of the control unit. In such instance, it is an object of the invention to compensate for such non-linearity to the end that the potential delivered to the ultimate indicating means shall vary substantially linearly with motion or displacements affecting the control unit.

2

Further objects and advantages of the invention will be made evident hereinafter.

In the drawing, one embodiment of the control unit is shown, together with several circuits usable therewith or with modifications thereof, without intention of limiting the invention thereto.

Referring to the drawing:

Figure 1 is a diagrammatic view in vertical cross section of the control unit of the invention;

Figure 2 is a vertical sectional view taken on the line 2—2 of Figure 1;

Figure 3 is a simplified wiring diagram indicating a circuit well adapted for use with the control unit of Figure 1;

Figures 4 to 7, inclusive, indicate alternative circuits usable with the control unit of Figure 1; and Figure 8 is a representation indicating graphically the manner of obtaining substantially linear or proportional indications even when the potential delivered to the meter varies non-proportionally relative to movement of an element of the control unit.

Referring particularly to Figure 1, the control unit of the invention is indicated generally by the numeral 10 and includes a core 11 and an armature 12 defining a magnetic circuit.

The core 11 is of general E shape, being formed by a plurality of E-shaped laminations suitably held together or being constructed of a suitable solid material or of powdered magnetic material bound together by non-magnetic dielectric material as is known in the art. As shown, it includes end legs 13 and 14 and a central leg 15 which is shorter than the end legs to provide a space for the armature 12.

The armature 12 is disposed in this space and is formed of suitable magnetic material. This armature is of a length less than the dimension between the end legs 13 and 14 so as to provide air gaps 17 and 18. Likewise, the armature 12 is so mounted as to provide an air gap 19 between the armature and the central leg 15, this air gap being narrow compared to the end gaps 17 and 18 and being of constant size except for the infinitesimal and negligible change when the armature moves bodily through a locus of motion determined by the attachment means to be presently described.

It is the general purpose of the device of the invention to move the armature 12 substantially longitudinally and substantially as indicated by the double-headed arrow 20 in response to the measurement to be taken. It will be clear that movement of the armature in one direction will decrease the gap 17 and simultaneously increase the gap 18, thus decreasing the reluctance of the flux path formed between the central leg 15 and the end leg 13 while increasing the reluctance of the flux path between the central leg 15 and the end leg 14. The reluctance of these flux paths will be oppositely changed when the armature is moved in the opposite direction.

A suitable attachment means 21 is provided for moving the armature 12 in the direction of the double-headed arrow 20. This attachment means may well comprise a parallel-motion device and should be of such nature as to maintain the armature 12 in constant alignment with the ends of the legs 13 and 14 and maintain the faces of all of the air gaps parallel, while at the same time controlling the motion so as to maintain the gap 19 of substantially constant dimension.

The attachment means 21 shown in Figure 1 has been found particularly advantageous in this respect and includes a U-shaped frame formed of spring material, such as Phosphor bronze, spring brass, or similar material, preferably non-magnetic. It includes arms 21a and 21b bent forward from a base 21c, the forward ends of the arms 21a and 21b being bent outward to form flanges attachable to the armature 12 as by screws or rivets 22. The entire attachment member can be bent from a very thin strip of ribbon-like material and should have sufficient resiliency to permit displacement of the armature 12. This attachment means is a parallel-motion device for effecting movement of the armature 12 as indicated by the double-headed arrow 20. In this connection, flexure of the attachment member will occur predominantly at the bent sections thereof, which sections, in effect, serve as frictionless pivots of a parallelogram-type attachment. In this way, the armature 12 is guided to move in substantially its own longitudinal plane substantially parallel to the end of the central leg 15. Correspondingly, there is no friction between the armature and this central leg and the small air gap 19 therebetween remains of substantially constant width within the small limits of motion contemplated in the direction of the arrow 20. At the same time, the armature 12 is mounted in a substantially frictionless manner and a very slight degree of movement imparted to the attachment means 21 will move the armature 12 correspondingly without the necessity of overcoming static friction such as would be occasioned by the use of bearings determining the locus of motion of the armature 12.

The control unit is shown diagrammatically as being enclosed in a housing 23 formed of elements 23a and 23b detachably connected together. The E-shaped core 11 is suitably secured to an internal wall of the element 23b. The base 21c of the attachment means 21 may be rigidly connected to an opposite wall of the element 23a providing a depression in which the base 21c is retained by a clamping element 24 receiving a screw 25 passing through a removable section 26 of the housing element 23a.

Removably mounted in the lower portion of the housing element 23a is a sleeve 26 internally threaded to receive a tubular stop member 27 so that by turning this stop member the vertical position of the upper annular edge of the stop member can be changed. This upper annular edge serves as a stop means limiting the lowermost position of a head member 28a of a plunger 28 slidable with respect to the stop member 27 and extending downward to provide a tapered portion providing a contact surface 28b adapted to engage an article 29 resting on a base 30.

The upper end of the head member 28a is rounded to engage the correspondingly-rounded lower end of an operating pin 31 operatively connected to the armature 12. This connection is preferably formed by a block 32, preferably of non-magnetic material, connected to the armature within the space between the arms 21a and 21b of the attachment member, the block providing a bore into which the operating pin 31 is pressed to cause this pin and the block 32 to move as a unit. The arms 21a and 21b provide openings through which the pin 31 passes.

To force the operating pin 31 into resilient engagement with the head member 28a, a spring-actuated follower 33 moves in a sleeve 34 attached to the upper end of the housing element 23a. A spring 35 is compressed between the top of this follower and a spring-adjusting member 35a threaded into the sleeve 34. The engaging surfaces of the follower 33 and the operating pin 31 are preferably rounded, as shown.

The device is commonly used as a comparator for detecting and measuring small variations in size between different articles 29. To this end, the device may be calibrated while an article 29 of known dimension is between the contact surface 28b and the base 30. At this time, the housing 23 is moved up or down with respect to the base 30, by means not shown but well known in the art, until the armature 12 is substantially centered between the end legs 13 and 14 or until a balance or zero deflection or deflection to some predetermined point on the scale is obtained on the indicating means to be later described. The tubular stop member 27 should be adjusted to be a slight distance below the head member 28a of the plunger 28, but this adjustment should be such as to stop the downward motion of the armature 12 before the air gap 18 closes when the article 29 is removed. If, then, articles 29 are moved in sequence into the space between the contact surface 28b and the base 30, or if the article is moved along this space or the control unit 10 moved relative to the article, the armature will move with the plunger 28 and will increase one of the air gaps 17 and 18 and decrease the other correspondingly, thus proportionally decreasing the reluctance of the magnetic circuit completed through the armature and one of the end legs while proportionally increasing the reluctance of the magnetic circuit through the armature and the other of the end legs, the central leg 15 being common to the two magnetic circuits. By using these changes in reluctance, it is possible to indicate accurately extremely small deviations in the distance between the contact surface 28b and the base 30.

Acting in this regard, the embodiment of Figure 1 includes a primary winding 42 for sending flux through upper and lower flux paths including the end legs 13 and 14. Similarly, control windings 43 and 44 are shown around the end legs 13 and 14. Correspondingly, if the winding 42 is energized from a source of constant-frequency alternating potential (for example of commercial frequency or of higher-than-commercial frequency), the flux linkages will induce in the windings 43 and 44 potentials which will vary one with respect to the other as the armature 12 is moved. It will be clear that as the armature 12 shifts upward, for example, the inductive coupling between the windings 42 and 43 increases while that between the windings 42 and 44 decreases. In the preferred embodiment, with the armature in its central position as shown, the potentials induced in the windings 43 and 44 will be equal as these windings are preferably identical, particularly when the control unit is connected in the circuit shown in Figure 3. The flux densities in the magnetic circuit are kept low to work on the straight portion of the saturation curve and avoid errors such as would be present if saturation was approached.

Referring particularly to Figure 3, the control windings 43 and 44 are connected in series in additive relationship by a connection 47. Similarly, two rectifiers 50 and 51 are connected in series circuit, anode to cathode, by a connection 52. The series-connected rectifiers are connected by conductors 53 and 54 across the series-connected control windings 43 and 44. A potential-responsive means, comprising a galvanometer 55 in the preferred embodiment, is connected between the connections 47 and 52. The impedances of the rectifiers 50 and 51 are preferably equal but should at least have the same ratio with respect to each other as the ratio of potentials of the windings 43 and 44 if not designed to be equal.

With equal potentials induced in the control windings 43 and 44, current will flow on alternate half-cycles through the rectifiers, and as the system is then balanced, there will be no potential across the galvanometer 55. If the armature 12 shifts to increase the potential induced in the winding 43 and decrease the potential induced in the winding 44, the system will become unbalanced and a potential difference will be developed across the galvanometer 55, causing the pointer 56 thereof to deflect in a given direction. In like manner, if the armature 12 shifts to increase the induced potential in the winding 44 and decrease the potential in the winding 43, the pointer 56 will move in an opposite direction. In either instance, the shift of the pointer 56 will be substantially proportional to the movement of the contact surface 28b upward or downward from the centralized position shown in Figure 1. Consequently, by moving the housing 23 up and down when an article 29 of known dimension is in the position shown, the system can be brought to a point of balance, at which the pointer 56 lies opposite a zero indication at the center of the scale of the galvanometer. Articles 29 subsequently moved into the position shown in Figure 1 may be accurately compared with the standard and a direct indication of deviations from the standard obtained by noting the deflection of the pointer 56 moving above a properly calibrated linear scale. By use of this circuit, it is possible to use an electric zero center galvanometer 55, and to obtain linear deflections of the pointer 56, i. e., deflections which vary linearly with the motion of the plunger 28. In addition, the indication will be directional, indicating whether the deviations in dimension are positive or negative for, if the article compared is slightly larger in size than the standard, the pointer 56 will move in one direction from the zero point, while if the article is smaller than the standard, the movement of the pointer will be in the opposite direction from the zero point. In either instance, the deviations will be proportional to the movement of the plunger 28 from the standardized position.

Instead of employing a separate primary winding, such as shown in Figures 1 and 2, the device can be connected as shown in Figure 4, in which the control windings 43 and 44 are connected in series directly across the incoming line representing the source of alternating potential. Movement of the armature 12 will thus increase the potential across one of the windings while decreasing the potential across the other, the sum of the potentials remaining constant. This is accomplished by changing the relative reluctances of the flux paths, and thus the impedance of the windings 43 and 44. Aside from this, the circuit shown in Figure 4 is identical with that shown in Figure 3 and corresponding numbers have been applied. It will be understood that this same mode of connection of the windings 43 and 44 can be applied to the circuits shown in Figures 5 and 6 without departing from the spirit of the invention.

A slightly modified circuit of greater sensitivity is shown in Figure 5, which takes advantage of the rectifying and amplifying action of a triode vacuum tube. Here, the control windings 43 and 44 are connected differentially rather than additively as in Figures 3 and 4, the series connection therebetween being indicated by the numeral 60. As shown, a double-triode tube is used as a rectifying and amplifying means, this tube being indicated generally by the numeral 61 and including grids 62 and 63. It is desirable to change the potentials on the grids 62 and 63 in response to changes in potential across the windings 43 and 44, respectively. This may be done by a direct connection of these grids to the end terminals of the control windings 43 and 44, respectively, matching the impedance of these windings to the grid circuits, but it is preferred to insert in the circuit balancing transformers 65 and 66, the secondary windings 67 and 68 of which substantially match the impedance of the grid circuits of the tube 61. If cored transformers are used, the cores should be separate rather than using a common core for both transformers 65 and 66. As shown, the primary windings of these transformers are connected in series across the control windings 43 and 44, while the intermediate connection between the primary windings is connected by a conductor 69 to the connection 60, this conductor being preferably grounded as shown to produce a more stable system. Similarly, the secondary windings 67 and 68 are connected in series by a connection 70, the end terminals being respectively connected to the grids 62 and 63.

The tube 61 is shown diagrammatically as including two filaments, suitably energized by means not shown for heating cathodes 72 and 73 associated therewith. These cathodes are connected together and are joined by conductor 74 to the connection 70. Plates 75 and 76 are connected by conductors 77 and 78 to a resistor 79 which may be in the form of a potentiometer including a sliding contact 80. A transformer 81 provides a secondary winding 82, one terminal of which is connected to the sliding contact 80 and the other terminal of which is connected to the conductor 74, for supplying an alternating anode potential of the same frequency as that across the control windings 43 and 44. The potential-responsive meter, shown as a galvanometer 83, is connected between the conductors 77 and 78. This system is more sensitive than that shown in Figure 3 due, primarily, to the amplification factor of the tube 61. At the same time, it produces deflections of the meter 83 which are proportional to changes in position of the plunger 28.

In Figure 6, the left-hand part of the circuit is the same as in Figure 5 and is similarly numbered. Here, either the tube 61 can be used or copper-oxide or other rectifiers 85 and 86 connected cathode to cathode, as shown, to a center-tapped resistor 88, the conductor 74 extending to the center tap. Filter condensers 89 and 90 are connected respectively across the halves of the resistor 88 for filtering out the peaks and valleys of the rectified current to a desired extent. The transformers 65 and 66 can be eliminated in favor of a direct connection of the control windings 43 and 44 across the series-connected rectifiers, in which event the respective impedances should desirably be matched, but it is preferred to use these transformers and to match the impedances of the secondary windings to the impedances of the rectifiers.

The resistor 88 is shown as a part of a double-contact potentiometer including movable contacts 91 and 92, indicated by dotted lines 93 as being movable together. The movable contact 91 is connected to the grid of a pentode tube 94 including the usual indirectly-heated cathode 96 and the usual plate 97 associated with a grid element such as a screen grid 98. The plate 97 is connected by a conductor 99 to a resistor 100, the opposite terminal of which is connected to the positive terminal of a source of direct-current potential of suitable voltage. Connected across this source is a resistor 102 into which is tapped the indirectly-heated cathode 96 and the grid element 98 to apply appropriate potentials thereto. The movable contact 92 is connected to a movable contact 103 adjustably contacting the resistor 102. A potential-responsive means 105, comprising a galvanometer of the type previously referred to or a cathode ray tube, is connected between the conductor 99 and a movable contact 106 engaging the resistor 102.

With the circuit shown in Figure 6, the potential-responsive means 105 is preferably first brought to a zero reading by disconnecting the input to the tube and moving the contact 106 until this is achieved. The device is then calibrated with the input circuit connected. For example, the housing 28 can be moved slightly with respect to the base 30 with an article 29 of known size on the base, as in the previously-described embodiments, until the potential-responsive means 105 indicates zero or some other predetermined point selected with reference to the gauging operation to be performed. This is the preferred manner of calibrating but, if desired, the connection 93 can be shifted to change the positions of the movable contacts 91 and 92 to vary the zero reading of the meter 105 while the armature 12 is in substantially central position or displaced therefrom by a previously selected amount.

In this embodiment shown in Figure 6, the system ahead of the pentode 94 is substantially linear in operation in that the grid potential changes substantially proportionally with respect to movement of the plunger 28. To obtain linear or proportional deflections of the potential-responsive means 105, the pentode 94 is so chosen and connected as to produce an output which varies substantially proportionally relative to the tube input.

Figure 7 illustrates another embodiment of the invention which can often be used to advantage, permitting further simplification of the control unit shown in Figure 1. Here, only the previously-described control winding 43 is shown as being used and in this event, of course, the magnetic circuit shown in Figure 1 can be considerably simplified by eliminating the lower leg 14, as well as the lower portion of the armature 12. Connected in series with the control winding 43 across the incoming line is a variable impedance 120 forming another control winding, which can be, and preferably is, remote from the control unit 10. This variable impedance may be a variable resistor but is preferably a variable reactance having an impedance of the same order as that of the winding 43 so that the current and voltage in the two portions of the output circuit to which the winding 43 and impedance 120 are respectively connected will have substantially the same phase relationship. The general nature of the circuit of Figure 7 is the same as that of Figure 6, the various elements other than the winding 43 and the impedance 120 being indicated by primed numerals for purpose of simplicity.

In this embodiment, as in those previously described, it is desirable to deliver to the meter 105' potentials which vary proportionally with movement of the plunger 28. There may be minor variations from such proportionality in the system shown, resulting from the design of the control unit so that the input to the amplifier may not vary strictly proportionally with movement of the plunger 28. For example, the potential across the winding 43 may change somewhat non-proportionally with respect to the movement of this plunger. In some instances, these non-linear variations can be tolerated or compensated for in the indicating means or in the design of the control unit but, in those installations requiring a high degree of accuracy, it is desirable to transmit to the indicating means a potential which varies linearly or proportionally with the movement of the plunger 28.

To illustrate this and the manner of compensating for slight non-proportionality, the line C of Figure 8 represents a linear or proportional variation. The curve A represents the input to the amplifier and shows, considerably exagerated, the deviation from a linear or proportional relation. Correction for the non-proportional nature of the input to the amplifier can be accomplished in various ways as suggested, but I find it particularly advantageous to use an ortho amplifier having a characteristic curve which effects this compensation. For example, by proper selection and adjustment of the amplifier, a characteristic curve, indicated at B in Figure 8, can be obtained therefrom which compensates for the non-linear nature of curve A to produce a substantially linear or proportional relationship, indicated by the line C, thus resulting in a proportional output which can be delivered to the indicating means 105'. In such an ortho amplifier, variations in input, for example grid potential, will produce non-proportional variations in output, for example plate potential, and this characteristic can be used to compensate for any non-proportional input to the amplifier, represented by the curve A, to make the output vary substantially proportionally with changes in position of the plunger 28. It will be apparent that the compensation effected by the amplifier, represented by tube 94' in Figure 7, need not extend throughout the complete distance through which the curves A and B are separated in Figure 8. Accurate compensation need be effected only in the range used by the instrument, for example between dotted lines 121 and 122. In the showing of Figure 7 where a single tube is used, this may be of the R. C. A. 58 type to effect the desired compensation.

In adjusting the system shown in Figure 7, the meter 105' is first brought to a zero reading, with no input to the tube 94', by adjusting the contact 106'. Thereafter, the input circuit is connected and tests are made to check the proportionality between movement of the plunger 28 and the indications on the meter 105'. If a proportional relationship does not exist, the characteristics of the ortho amplifier can be adjusted, as by changing the position of the movable contact 103' or otherwise changing the potentials applied to the tube 94' until the output varies proportionally with respect to plunger movement.

In practice, the device is then calibrated for use by placing an article 29 of known size between the contact base 28b and the base 30. The meter 105' is brought to a zero indication by moving the housing 23 with respect to the base 30, though accurate adjustments can be more readily obtained by adjusting the variable impedance 120 or by shifting the connection 93' operating the movable contacts 91' and 92'. Thereafter, other articles can be inserted and the meter 105' will indicate accurately the deviations from the desired standard, both in direction and magnitude.

It will be apparent that in each of the embodiments of the invention an overall change in voltage of the supply line will not unbalance the zero reading of the system. For example, in Figure 3 a reduction in line voltage will reduce uniformly the potentials across the windings 43 and 44. This will reduce the current flowing on alternating half cycles through the rectifiers 50 and 51, but the potential across the galvanometer 55 will not materially be varied. The same is true whether the windings 43 and 44 are connected across the line, as in Figure 4, or whether the winding 43 (or some other one of the windings shown in Figure 1) is connected in series with the variable impedance 120 across the line, as indicated in Figure 7. This is an important advantage, particularly as such devices are commonly used on electrical circuits subject to transient changes in potential as, for example, when additional electric motors are thrown on the line, thus reducing temporarily the voltage thereof until the motor comes up to speed.

It will be further apparent that it is within the contemplation of the invention to move the attachment means 21 in response to various means. Movement or displacement can be effected by means moving in response to changes other than dimension. Also, it will be apparent that modifications can be made in the magnetic circuit without departing from the spirit of the invention.

Commonly, the indicating means comprising the meter is disposed in spaced relationship with respect to the control unit, and if a remote indication is desired, all of the equipment other than the winding or windings used in the control unit can be positioned at the remote point.

Various changes and modifications can be made without departing from the spirit of the invention as defined in the appended claims.

I claim as my invention:

1. In an electrical measuring device, the combination of: means providing two flux paths; an element movable in one direction to increase the reluctance of one flux path while relatedly decreasing the reluctance of the other flux path and movable in a different direction to decrease the reluctance of said one flux path while relatedly increasing the reluctance of the other flux path; two windings respectively linked with said flux paths and each providing two terminals, one terminal of one of said windings being electrically common with respect to one terminal of the other of said windings to maintain these two terminals at the same potential; means for energizing said windings from a source of alternating potential to produce a potential difference across each of said windings whereby the ratio of said potentials across said windings changes with movement of said element; two rectifier means respectively connected to the remaining end terminals of said windings to pass current in the same direction with respect to the remaining end terminals of said windings; and a center-tapped output impedance means and means for connecting same across the output of said two rectifier means and for connecting the center tap to said electrically common terminals of said windings, said output impedance means including a bi-directional meter responsive to changes in direction and magnitude of the potential across the output of said two rectifier means to indicate the direction and magnitude of movement of said element.

2. In a measuring device adapted to indicate the amount of movement of an element, the combination of: a pair of windings providing two terminals electrically connected together to be at the same potential and two end terminals; means for energizing said windings from a source of alternating current to produce a potential difference across each of said windings; means for varying the ratio of said potentials across said windings in response to a movement of said element; two rectifier means connected respectively to said end terminals in identical relationship with respect to said end terminals of said windings; an output impedance connected across the output of said rectifiers and providing an intermediate connection; electric means for connecting said intermediate connection and said electrically-connected terminals of said windings; and a bi-directional meter connected to be responsive to the potential across at least a portion of said output impedance and providing a calibrated scale upon which the distance moved by said element is readable.

3. In a measuring device adapted to indicate the amount of movement of an element, the combination of: a pair of windings providing two terminals electrically connected together to be at the same potential and two end terminals; means for energizing said windings from a source of alternating current to produce a potential difference across each of said windings; means for differentially varying the potential differences across said windings to vary the ratio of said potential differences in response to the direction and magnitude of movement of said element; a first rectifier means providing an anode, a cathode, and a grid, said grid being connected to one of said end terminals; a second rectifier means providing an anode, a cathode, and a grid, said grid thereof being connected to the other of said end terminals; an impedance connected between said anodes and providing an intermediate connection; means for connecting said cathodes to each other and to said two electrically-connected terminals of said windings; means including a source of anode potential connected between said intermediate connection and said electrically-connected terminals of said windings; and means for indicating the direction and magnitude of the movement of said element, said last-named means comprising a bi-directional meter connected across and responsive to the magnitude and polarity of the potential across at least a portion of said impedance.

4. In a measuring device adapted to indicate the amount of movement of an element, the combination of: a pair of windings providing a common terminal and two end terminals; means for energizing said windings from a source of alternating current to produce a potential difference across each of said windings; means for varying the ratio of said potentials across said windings in response to a movement of said element; a first rectifier means providing an anode, a cathode, and a grid, said grid being connected to one of said end terminals; a second rectifier means providing an anode, a cathode, and a grid, said grid thereof being connected to the other of said end terminals; means for connecting said cathodes to each other and to said common terminal of said windings; an output impedance connected to said anodes of said rectifier means and providing an intermediate connection; means for delivering an alternating potential between said intermediate connection and said common terminal of said windings; and a meter responsive to changes in voltage drop across at least a portion of said output impedance.

5. In an electric measuring device adapted to indicate the direction and amount of movement of an element, the combination of: a pair of windings differentially connected together to provide a common terminal and two end terminals; means for energizing said windings from a source of alternating potential to produce a potential difference across each of said windings, the potentials of said end terminals increasing and decreasing together with respect to the potential of said common terminal; means for changing the ratio of the potential differences across said windings in response to movement of said element by increasing the potential across one winding and relatedly decreasing the potential across the other winding upon movement of said element in one direction and decreasing the potential across said one winding and relatedly increasing the potential across said other winding upon movement of said element in an opposite direction; an output impedance means having an intermediate terminal and providing two sections on opposite sides thereof, each section providing an end terminal; a conductor means connecting said intermediate terminal of said output impedance means to said common terminal of said pair of windings; a first circuit including a rectifying means for connecting one section of said output impedance means to one of said windings, in a manner to change the current through said one section in response to changes in potential across said one of said windings, said conductor means forming a part of said first circuit and said rectifying means being connected to permit current flow through said conductor means in one direction and to impede current flow therein in the other direction; a second circuit including another rectifying means for connecting the other section of said output impedance means to the other of said windings in a manner to change the current through said other section in response to changes in potential across said other of said windings, said conductor means forming a part of said second circuit and said other rectifying means being connected to permit current flow through said conductor means in said one direction and to impede current flow therein in said other direction; and means for indicating the direction and magnitude of the movement of said element, said means comprising a bi-directional electric meter connected across at least a portion of each section of said output impedance means.

6. A combination as defined in claim 5, in which said means for energizing said windings includes an additional winding means inductively coupled to at least one of said windings and supplied with an alternating potential, and in which said conductor means includes a source of alternating potential.

7. In an electric measuring device, the combination of: a pair of substantially identical windings connected in series relationship to provide a common terminal; means for impressing an alternating potential difference across each of said windings; two tube means, each providing a grid, a cathode, and an anode; means for impressing between the grid and cathode of one tube means an alternating potential varying with the potential across one of said windings; means for impressing between the grid and cathode of the other tube means an alternating potential varying with the potential across the other of said windings; means for connecting said cathodes together and to a source of alternating anode potential; a potentiometer providing an impedance element and an adjustable contact, said impedance element being connected between said anodes and said adjustable contact being connected to said source of alternating potential in a manner to apply said alternating potential between said cathodes and said adjustable contact; a bi-directional electric meter connected across at least a portion of said impedance element; and means for differentially varying the potential differences across said windings.

8. In an electric measuring device, the combination of: two control windings energized from a source of alternating potential; means for changing the ratio of the potentials across said control windings; a pair of coupling transformers, each providing primary and secondary windings; means for connecting said primary windings respectively across said control windings; means for connecting said secondary windings together to provide a common terminal and two end terminals; two rectifying means, each providing elements comprising an anode, a grid, and a cathode; means for connecting said grids of said two rectifying means respectively to said end terminals; means for connecting said cathodes of said two rectifying means together and to said common terminal; an output impedance means connected between said anodes of said two rectifying means; a source of anode potential connected to said anodes through said output impedance means; and a bi-directional meter connected across at least a portion of said output impedance means.

9. A combination as defined in claim 8, in which said output impedance provides an intermediate connection intermediate the ends thereof, and in which said source of anode potential includes a source of alternating potential connected between said intermediate connection and said common terminal of said secondary windings.

10. A combination as defined in claim 8, including a primary winding energized from a source of alternating potential and inductively coupled to said control windings, and in which said means for changing the ratio of the potentials across said control windings includes means for changing the inductive coupling between said primary winding and at least one of said control windings.

11. In an electric measuring device, the combination of: a pair of windings connected in series relationship to provide a common terminal; electron tube means providing a cathode means, two anodes, and two grids, said grids respectively controlling the anode currents; means for impressing between one grid and said cathode means a potential varying with the potential across one of said windings; means for impressing between the other grid and said cathode means a potential varying with the potential across the other of said windings; an output impedance connected between said anodes and providing an intermediate connection; means for impressing alternating potentials of the same frequency across each of said windings and between said intermediate connection and said cathode means whereby the potentials of said grids change in timed relationship with the potentials applied to said anodes; means for relatively varying the magnitude of the potential differences across said windings in response to the measurement to be taken; and a bi-directional meter connected between portions of said output impedance on opposite sides of said intermediate connection.

12. In an electric measuring device, the combination of: a primary winding; a pair of secondary windings inductively coupled with said primary winding, said secondary windings being connected in series relationship to provide a common terminal; electron tube means providing a cathode means, two anodes, and two grids, said grids respectively controlling the anode currents; means for impressing between one grid and said cathode means a potential varying with the potential across one of said secondary windings; means for impressing between the other grid and said cathode means a potential varying with the potential across the other of said secondary windings; an output impedance connected between said anodes and providing an intermediate connection; means for maintaining said cathode means at substantially the same potential as said common terminal of said secondary windings; means for impressing alternating potentials of the same frequency across said primary winding and between said intermediate connection and said cathode means, whereby alternating potentials are induced in both secondary windings and whereby the potentials of said grids vary in step with the alternating potentials applied to said anodes; means for varying the inductive coupling between said primary winding and one secondary winding with respect to the inductive coupling between said primary winding and the other secondary winding and in response to the measurement to be taken to vary the ratio of voltages across said secondary windings in response to such measurement; and a bi-directional meter connected between portions of said output impedance on opposite sides of said intermediate connection.

13. A combination as defined in claim 12, in which said secondary windings are differentially connected together and in which said means for varying the inductive coupling includes means for increasing the coupling of said primary winding with one secondary winding while correspondingly decreasing the coupling of said primary winding with the other secondary winding and vice versa to differentially change the alternating voltages induced in said secondary windings.

14. In an electric measuring device adapted to indicate the direction and amount of movement of an element, the combination of: a pair of windings connected together to provide a common terminal and two end terminals; an output impedance means having an intermediate terminal and providing two sections on opposite sides thereof, each section providing an end terminal; a pair of rectifying means and means for connecting same respectively to the end terminals of said sections of said output impedance in a manner to pass current in the same direction with respect to these end terminals and to govern the rectified current passing respectively through said sections of said output impedance; means for connecting said intermediate terminal of said output impedance to said common terminal of said windings; means for differentially varying the potentials across said windings in response to movement of said element to modify the relative amounts of rectified current passing through said sections of said output impedance; and means for indicating the direction and magnitude of the movement of said element, said means comprising a bi-directional electric meter connected across at least a portion of each section of said output impedance.

15. In an electric measuring device adapted to indicate the direction and amount of movement of an element, the combination of: a pair of control windings differentially connected together to provide a common terminal and two end terminals; means for energizing said control windings from a source of alternating potential to produce a potential difference across each of said control windings; means for changing the ratio of the potential differences across said control windings in response to the direction and magnitude of movement of said element; two coupling transformers each providing a primary winding and a secondary winding; means for connecting said primary windings respectively across said control windings; means for electrically connecting two terminals of said secondary windings to maintain these terminals at the same potential, each secondary winding providing a remaining end terminal; an output impedance means having an intermediate terminal and providing two sections on opposite sides thereof, each section providing an end terminal; a conductor means connecting said intermediate terminal of said output impedance means to said electrically-connected terminals of said secondary windings; two rectifier means; a first circuit for connecting one of said rectifier means between said remaining end terminal of one secondary winding and said end terminal of one section of said output impedance means in a manner to change the current through said one section in response to changes in potential across said one of said secondary windings, said conductor means forming a part of said first circuit; a second circuit for connecting the other of said rectifier means between said remaining end terminal of the other secondary winding and said end terminal of the other section of said output impedance means in a manner to change the current through said other section in response to changes in potential across the other of said secondary windings, said conductor means forming a part of said second circuit, said two rectifier means being connected to permit current flow through said conductor means in a single direction and to impede current flow therein in a reverse direction; and means for indicating the direction and magnitude of the movement of said element, said means comprising a bi-directional electric meter connected across at least a portion of each section of said output impedance means.

16. A combination as defined in claim 2, in which said output impedance comprises two potentiometers, each including an impedance means and an adjustable contact arm, said impedance means being connected together to provide said intermediate connection, and including means for connecting said meter to said contact arms to be responsive to a change in relative potential of said contact arms.

17. A combination as defined in claim 2, in which said output impedance comprises two potentiometers, each including an impedance means and an adjustable contact arm, said impedance means being connected together to provide said intermediate connection, and including means for connecting said meter to said contact arms to be responsive to a change in relative potential of said contact arms, said last-named means including an electron tube providing input and output elements and means for connecting said input elements to said adjustable contact arms to be responsive to changes in potential thereof and means for connecting said output elements to said meter.

18. A combination as defined in claim 2, in which said windings are secondary windings and which combination includes two primary windings inductively coupled respectively with said secondary windings and providing two terminals electrically connected together and two end terminals, and including two control windings providing two terminals electrically connected together and to the electrically connected terminals of said primary windings and two end terminals respectively connected to the end terminals of said primary windings, said energizing means developing potentials across said control windings and said ratio-varying means varying the ratio of the potentials across said control windings.

19. A combination as defined in claim 2, in which said windings are secondary windings and which combination includes two primary windings inductively coupled respectively with said secondary windings and providing two terminals electrically connected together and two end terminals, and including two control windings providing two terminals electrically connected together and to the electrically connected terminals of said primary windings and two end terminals respectively connected to the end terminals of said primary windings, said energizing means developing potentials across said control windings and said ratio-varying means including means for varying the potential across only one of the control windings relative to the other.

20. A combination as defined in claim 2, in which said windings are secondary windings and which combination includes two primary windings inductively coupled respectively with said secondary windings and providing two terminals electrically connected together and two end terminals, and including two control windings providing two terminals electrically connected together and to the electrically connected terminals of said primary windings and two end terminals respectively connected to the end terminals of said primary windings, said energizing means including means for applying an alternating potential across the two end terminals of said control windings, said ratio-varying means including means for varying the potential across only one of the control windings relative to the other.

RICARDO MESTAS.